(12) United States Patent
Koga et al.

(10) Patent No.: US 9,408,425 B2
(45) Date of Patent: Aug. 9, 2016

(54) GLOVE

(71) Applicant: TOWA CORPORATION CO., LTD., Kurume (JP)

(72) Inventors: Nobuyoshi Koga, Kurume (JP); Risa Murata, Kurume (JP); Yukiko Tsuchimochi, Kurume (JP)

(73) Assignee: Towa Corporation Co., Ltd., Kurume-Shi (JP)

( * ) Notice: Subject to any disclaimer, the term of this patent is extended or adjusted under 35 U.S.C. 154(b) by 0 days.

(21) Appl. No.: 14/594,390

(22) Filed: Jan. 12, 2015

(65) Prior Publication Data

US 2015/0181954 A1      Jul. 2, 2015

Related U.S. Application Data

(63) Continuation of application No. PCT/JP2014/069769, filed on Jul. 28, 2014.

(30) Foreign Application Priority Data

Dec. 27, 2013   (JP) ................................ 2013-271333

(51) Int. Cl.
*A41D 19/015* (2006.01)
*A41D 19/04* (2006.01)
*D06C 11/00* (2006.01)
*A41D 19/00* (2006.01)
*B29C 41/14* (2006.01)
*B29C 41/20* (2006.01)
*D06C 9/00* (2006.01)
(Continued)

(52) U.S. Cl.
CPC .......... *A41D 19/015* (2013.01); *A41D 19/0065* (2013.01); *A41D 19/04* (2013.01); *B29C 41/14* (2013.01); *B29C 41/20* (2013.01); *D06C 9/00* (2013.01); *D06C 11/00* (2013.01); *D06M 15/693* (2013.01); *D06M 15/70* (2013.01); *D06N 3/0009* (2013.01); *D06N 3/04* (2013.01); *D06N 3/06* (2013.01); *D06N 3/10* (2013.01); *D06N 3/106* (2013.01); *D06N 3/14* (2013.01); *A41D 19/01529* (2013.01); *B29L 2031/4864* (2013.01); *D06N 2203/022* (2013.01); *D06N 2205/24* (2013.01); *D06N 2209/125* (2013.01); *D06N 2209/128* (2013.01); *D06N 2211/103* (2013.01)

(58) Field of Classification Search
CPC ........... A41D 19/015; A41D 19/01529; A41D 19/04; A41D 19/0065; A41D 2500/10; D03D 15/00; D06C 11/00; B29L 2031/4864
See application file for complete search history.

(56) References Cited

U.S. PATENT DOCUMENTS

2007/0204381 A1* 9/2007 Thompson ......... A41D 19/0065
2/159

FOREIGN PATENT DOCUMENTS

JP        07-119028 A1      5/1995
JP        2000-096322 A1    4/2000
(Continued)

*Primary Examiner* — Anna Kinsaul
(74) *Attorney, Agent, or Firm* — Burr & Brown, PLLC

(57) ABSTRACT

The present invention provides a glove having both high softness and high air tightness. A glove of the present invention has a fiber-made base having a shape of a hand of a person and a coating formed on a surface of at least a portion of the base, where a burning treatment is applied to the base, air tightness of a portion of the glove which has been applied with the burning treatment is maintained even when pressure of 9 kPa or higher is imparted to inside of the base, and the fiber-made base is formed of filament yarns.

6 Claims, 9 Drawing Sheets

(51) Int. Cl.
*D06M 15/693* (2006.01)
*D06M 15/70* (2006.01)
*D06N 3/00* (2006.01)
*D06N 3/04* (2006.01)
*D06N 3/06* (2006.01)
*D06N 3/10* (2006.01)
*D06N 3/14* (2006.01)
*B29L 31/48* (2006.01)

(56) References Cited

FOREIGN PATENT DOCUMENTS

| | | | |
|---|---|---|---|
| JP | 2003-064511 | A1 | 3/2003 |
| JP | 2003-253508 | A1 | 9/2003 |
| JP | 2010-106403 | A1 | 5/2010 |
| JP | 2012-102445 | A1 | 5/2012 |

* cited by examiner

GLOVE

BACKGROUND OF THE INVENTION

1. Field of the Invention

The present invention relates to a glove provided with a coating, and to a glove having not only waterproof performance but also air tightness.

2. Description of the Related Art

Conventionally, various kinds of gloves are used in various aspects such as manufacturing work in a factory, farmwork, gardening, work on light duty, and construction work. The glove protects a hand of a worker and achieves work efficiency. Here, as the glove, there are one of a kind obtained by knitting fibers such a cotton glove and one of a kind obtained by using a rubber or resin for waterproof performance or air tightness.

The glove may be required to have air tightness or waterproof performance due to application or contents of work required therefor. When a work touching water is an object to be worked, the glove is required to have waterproof performance. Alternatively, when a work relating to electricity is performed, the glove is required to have high air tightness for electrical insulation.

In order to improve such waterproof performance or air tightness, a glove may be manufactured by utilizing only resin material such as rubber or vinyl chloride. Regarding the rubber, vinyl chloride, or the like, since its material itself has high air tightness, a glove having high air tightness can be obtained unless there is a failure in manufacturing.

A glove manufactured by using only a material inherently having air tightness, such as rubber or vinyl chloride naturally has high air tightness, as described above. However, when the thickness of the glove is thick, softness lowers due to the feature of the material, which results in deterioration of impression from use and wearing feeling to grasping performance. On the other hand, when the thickness of the glove is made thin, softness occurs, so that the impression from use can be improved, but strength or durability becomes poor. In some cases, fine damages occur in the glove, which may result in lowering of the air tightness.

Further, since the material such as rubber or vinyl chloride directly touch a surfaces of a hand of a user, there is such a problem that after the glove is worn, smell of the glove remains on a surface of the hand. Of course, since the material directly contacts a surface of the hand during wearing, wearing feeling deteriorates. As these results, the glove formed of only the material such as rubber vinyl chloride has high air tightness, but it has a problem about the impression from use or the wearing feeling.

Here, in order to improve air tightness without causing the impression from use or the wearing feeling to lower, a technique of forming a base which is a basic shape of a glove from fiber-made material and coating a surface of the base with a material such as rubber or vinyl chloride having air tightness is also proposed.

Here, in order to form the fiber-made base of the glove, spun yarns with short fiber lengths are frequently used. The spun yarn is frequently formed of natural fiber such as cotton. A plurality of spun yarns are twisted to form a basic fiber so that the fiber-made base is formed. The spun yarn is short in fiber length, as the name suggest, and the basic fiber obtained by twisting a plurality of spun yarns with a short fiber length cause many scuffing pieces. End portions of fibers appear in various portions of the basic fiber, so that these end portions cause scuffing pieces.

In addition, the end portions of spun yarns appear not only on a line extending along the basic fiber but also various portions on a surface of the base having a shape of a hand of a person due to the basic fibers being knitted in a plane fashion. That is, in the base, a countless number of scuffing pieces necessarily occur at various portions.

Even if coating such as rubber of resin is applied to a surface of the base having the countless number of scuffing pieces, such a problem occurs that some of the scuffing pieces penetrate the coating such as rubber or resin. If the scuffing piece penetrates the coating, a hole or a tear occurs. Even if the hole or tear is very small, air leakage is caused. As a result, there occurs such a problem that air tightness of a glove degrades.

On one hand, since the spun yarn has a short fiber length, excellent texture can be obtained, and wearing feeling and comfort are high as a glove. It is desired that spun yarns are used in manufacturing for a glove having wearing feeling and comfort. As described above, however, the base formed of spun yarns has such a problem that a countless number of scuffing pieces occur, so that even if a coating is applied to the glove, air tightness is impaired. A technique for preventing such scuffing is proposed (for example, see Japanese Patent Application Laid-Open No. H07-119028 and Japanese Patent Application Laid-Open No. 2012-102445).

On the other hand, chemical fiber such as polyester can be controlled regarding its fiber length, a filament yarn with a long fiber length can be realized. In the case of the filament yarns, occurrence of end portions thereof in the middle of the basic fiber is reduced. Therefore, a countless number of scuffing pieces occurring in a jumping fashion of the end portions hardly occur. Therefore, it has also been considered that filament yarns are used to form the base.

However, since the basic fiber obtained by twisting a plurality of filament yarns has a long fiber length, other problems other than the scuffing may occur. One of the problems is a partial projection of a fiber shape due to twisting of the filament yarns, or the like. Alternatively, a catch of a fiber may occur. Such a projection or a catch does not occur countlessly, which is different from a countless number of scuffing pieces occurring in the from composed of spun yarns, but when a coating is formed, the projection or the catch forms a hole in the coating, which results in such a problem that air tightness is lowered.

A technique of improving the air tightness in response to such a problem in the filament yarn is also proposed (see Japanese Patent Application Laid-Open No. 2010-106403).

Japanese Patent Application Laid-Open No. H07-119028 discloses a technique of reducing scuffing by burning one face of a base formed of spun yarns.

However, since a countless number of scuffing pieces occur in the base formed of spun yarns, it is difficult to burn all of these scuffing pieces. When it is attempted to burn all of the scuffing pieces, heating to the base becomes excessive, which may result, in partial burning of the base. Further, when the scuffing pieces are burnt, pills may occur. The pill may cause a hole or a tear in the coating like the scuffing.

Japanese Patent Application Laid-Open No. 2012-102445 discloses a technique of burning a surface of a base like Japanese Patent Application Laid-Open No. H07-119023.

However, Japanese Patent Application Laid-Open No. 2012-102445 has a similar problem to that in Japanese Patent Application Laid-Open No. H07-119028. The inventions of Japanese Patent Application Laid-Open No. H07-119028 and Japanese Patent Application Laid-Open No. 2012-102445 perform a burning treatment for solving scuffing occurring in a base mainly composed of spun yarns. However, since a countless number of scuffing pieces occur, it is difficult to burn all of the scuffing pieces. Further, there is a concern about excessive burning. In addition, pills may occur. In each case, such a problem remains that, a hole or a tear cannot be prevented from occurring in a coating. As a result, the techniques disclosed in Japanese Patent Application Laid-Open No. H07-119028 and Japanese Patent Application Laid-Open No. 2012-102445 have such a problem that the air tightness cannot be raised sufficiently.

Japanese Patent Application Laid-Open No. 2010-106403 discloses a glove having a three-layered structure obtained by laminating a polyurethane layer, a chlorosulfonated polyethylene layer, and an isobutylene based block copolymer. The respective layers are materials excellent in waterproof performance and air tightness and having different properties. Japanese Patent Application Laid-Open No. 2010-106403 attempts to realize a glove where since the different, properties compensate each other, so that a glove where softness is improved while the waterproof performance and the air tightness being raised.

However, since rubber or resin are laminated in the glove disclosed in Japanese Patent Application Laid-Open No. 2010-106403, there is a limitation in the softness. In particular, a workability at a fingertip of a user or the like is poor, which results in such a problem that the glove is unsuitable for a near work. Further, since the glove has the laminated layer made of rubber or resin, smell remains on a surface of a hand of a user, which also results in such a problem that unpleasantness after use occurs.

For example, in order to prevent a loop-shaped projecting occurring in the base formed of filament yarns or a hole or a tear in a coating due to the scuffing remaining in the base formed of spun yarns (for example, remaining even if a burning treatment has been performed), it is considered that thickness is increased by adopting a multi-layered laminate as the layer of the coating like Japanese Patent Application Laid-Open No. 2010-106403. In this case, however, wearing feeling not only becomes poor but also the softness and the grasping performance deteriorate, which also results in such a problem that practical use is poor.

As described above, in the gloves of the conventional art, there is a problem that air tightness lowers due to the problems of the fiber-made bases. Of course, various treatments or steps for preventing these problems from occurring include such a problem that manufacturing cost is increased.

SUMMARY OF THE INVENTION

In view of the above problems, an object of the present invention is to provide a glove which realizes high air tightness in a case where a base formed of filament yarns is used.

In view of the above problems, a glove of the present invention is provided with a fiber-made base having a shape of a hand of a person, and a coating formed on a surface of the base, wherein a burning treatment is applied to the base; even when a pressure of 9 kPa or higher is applied inside the base, air tightness of a portion of the glove applied with the coating is maintained; the fiber-made base is formed of only filament yarns; the burning treatment burns off loop-shaped projecting portions occurring on a surface of the base due to the filament yarns to flatten a height of a textured surface on the surface of the base to a predetermined value or less; and a coating liquid forming the coating has a viscosity falling into a range from 300 mPa·s or more to 1500 mPa·s or less.

The glove of the present invention is a glove obtained by applying a resin coating on a fiber-made base, which can realize high air tightness. Further, since the air tightness is raised without making the thickness of the coating thick or adopting a multilayers as the coating layer, which is different from the conventional art, impairment of the softness of the glove can be reduced. Further, since a manufacturing method for forming a coating using a coagulant can be used, variations or cost for manufacturing a base can be lowered.

In particular, since the problem due to the fiber-made base itself is solved and a slight hole or tear in the coating is further prevented from occurring, working burden and material burden at a forming time of a coating can be reduced. Particularly, since it is unnecessary to make a coating thick in order to raise air tightness, the wearing feeling and the impression from use can also be improved, while the softness is being maintained.

DETAILED DESCRIPTION OF THE INVENTION

Figure 1:
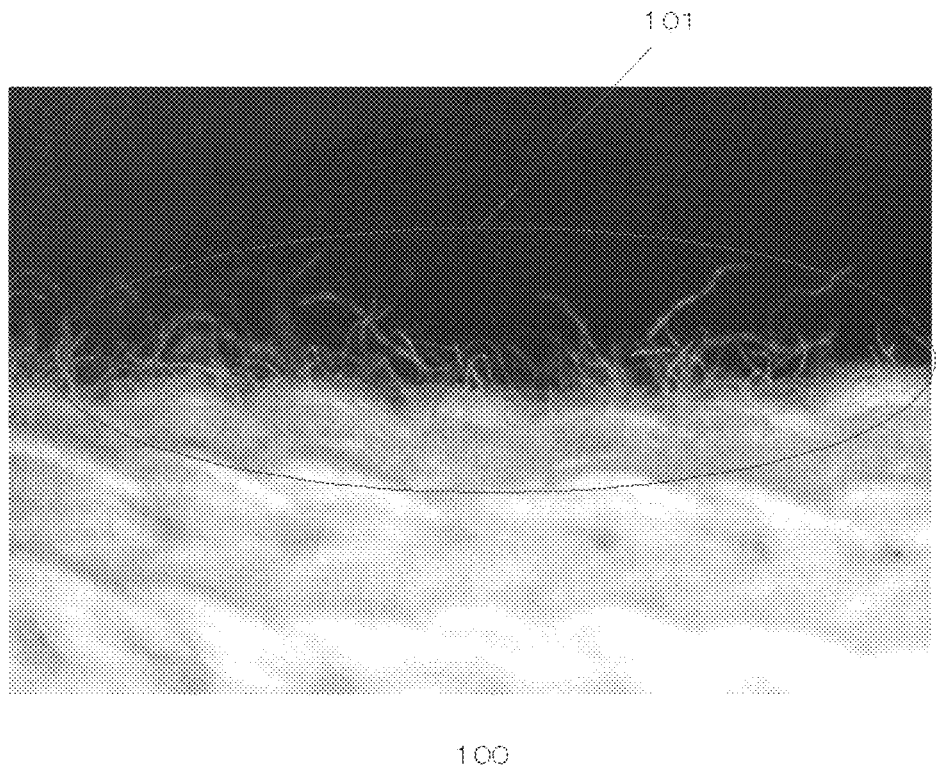
FIG. 1 is an enlarged photograph of a base formed of spun yarns in a problem analysis.

A glove according to a first embodiment of the present invention is provided with a fiber-made base having a shape of a hand of a person and a coating formed on a surface of the base, where a burning treatment is applied to the base; even when a pressure of 9 kPa or higher is applied inside the base, air tightness of a portion of the glove which has been applied with a coating is maintained; the fiber-made base is formed of only filament yarns; the burning treatment burns off loop-shaped projections occurring on a surface of the base due to filament yarns to flatten a height of a textured surface on a surface of the base to a predetermined value or less; a coating liquid for forming the coating has a viscosity in a range from 300 mPa·s or more to 1500 mPa·s or less.

With this configuration, a loop-shaped projection is burnt off, so that the textured surface on the surface of the base due to fibers fails into a fixed range. With this configuration, the textured surface falls into the fixed range, so that breaking of the coating caused by the textured surface on the surface of the base due to fibers can be reduced.

A glove according to a second embodiment of the present invention is further applied with a cleaning treatment for cleaning the base before being subjected to the burning treatment in addition to the first invention.

With this configuration, the base which has swelled due to a coagulate is shrunk, so that when the base is coated with a coating, holes or tears are hardly caused.

A glove according to a third embodiment of the present invention is configured such that oil component is removed in cleaning treatment in addition to the second invention.

With this configuration, the oil component is removed, so that when the base is coated with a coating, a coagulant or a coating liquid easily becomes familiar to the base or a projecting portion is hard to occur, so that holes or tears are hardly caused.

A glove according to a fourth embodiment of the present invention is configured such that a coating liquid is coated on the surface of the base using a coagulant in formation of the coating in addition to either one of the first to third embodiments.

With this configuration, formation of the coating is made easy.

A glove according to a fifth embodiment of the present invention is configured such that the filament yarns are each formed of at least, one of a polyester fiber, a nylon fiber, a vinylon fiber, a vinylidene fiber, a polypropylene fiber, and a polyethylene fiber which are fibers melted by burning in addition to either one of the first to fourth embodiments.

With this configuration, scuffing such as occurring due to spun yarns is hard to occur in the base.

A glove according to a seventh embodiment of the present invention is configured such that the coating liquid is applied to the base plural times in addition to the sixth embodiment.

With this configuration, formation of the coating is made easy.

A glove according to a sixth embodiment of the present invention is configured such that at least one material of a natural rubber, an acrylonitrile butadiene rubber, a chloroprene rubber, a chloroprene rubber, a polyvinyl chloride, acrylic resin, a chlorosulfonated polyethylene, and a polyurethane resin is used as the coating liquid in addition to the fourth or fifth embodiment.

With this configuration, a coating with high air tightness can be formed easily.

Embodiments

Analysis of Problems in the Conventional Art and Explanation of a Targeted Point of the Invention The inventor has analyzed the problems causing deterioration of air tightness in a glove where a surface of a fiber-made base is coated with a coating with high waterproof performance/air tightness such as resin.

The base is made of fibers and is formed by knitting various yarns. The fiber-made base formed in this manner appears to have sufficient flatness and evenness at naked eye, but it has fine textured surface or scuffing. Such textured surface or scuffing may cause a hole or a tear in a coating when the coating is formed.

When the base is formed using spun yarns, many fussing pieces such as described above occur. This is because end portions of the spun yarns cause fussing in the base. In the case of the spun yarn, it is necessary to knit the base using spun yarns, so that end portions of the yarns form scuffing pieces at various portions of the base.

The present inventor has formed a base using spun yarns and has confirmed the state of the base formed of the spun yarns. FIG. 1 is an enlarged photograph of a base formed of spun yarns in a problem analysis.

A countless number of scuffing pieces 101 have occurred on a surface of a base 100 shown in FIG. 1. A fiber used for formation of the base 100 is a spun yarn which does not have a length from one end portion of the base 100 to the other end portion thereof. Therefore, end portions of spun, yarns occur at various portions of the base 100. The end portion is an end portion of a yarn, so that it forms scuffing projecting from the surface of the base 100. As a result, as shown in the photograph of FIG. 1, a countless number of scuffing pieces occur on the surface of the base 100.

Figure 2:
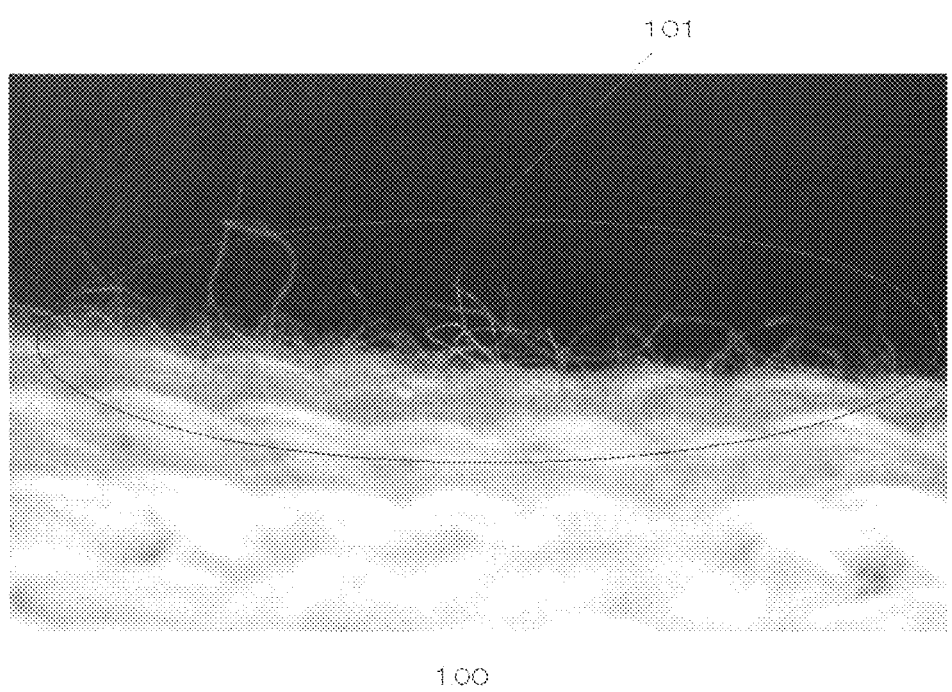
FIG. 2 is an enlarged photograph of the base formed of spun yarns where the base has been burnt in a problem analysis.

As explained in Japanese Patent Application Laid-Open No. H07-119028, Japanese Patent Application Laid-Open No. 2012-102445, and the like, it is proposed to burning-treat a surface of a base composed of spun yarns. The present inventor has actually burning-treat a surface of the base 100 (the base shown in FIG. 1) formed of spun yarns according to the step disclosed in these conventional arts. The state of the base after burning-treatment is shown in FIG. 2. FIG. 2 is an enlarged photograph after the base formed of spun yarns has been burning-treated in a problem analysis. As apparent from FIG. 2, even if the burning treatment is performed, many scuffing pieces 101 remain on the surface of the base 100.

As shown in FIG. 1, a large amount of spun yarns are used in the base 100 formed of spun yarns. The large amount of spun yarns has many end portions of the spun yarns. The many end portions cause a countless number of scuffing pieces 101. Since the countless number of scuffing pieces 101 occur, even if the burning treatment is performed, all of the scuffing pieces 101 cannot be incinerated.

As a result, as shown in FIG. 2, even if the base 100 formed of spun yarns is burning-treated as proposed in the conventional art, it is difficult to reduce the scuffing pieces 101 largely. Further, though the scuffing pieces can be reduced by performing the burning treatment for a long time, roughness feeling occurs due to pills generated by carbonization. The remaining scuffing pieces and pills cause holes or tears in the coating formed on the surface of the base 100. As a result, the glove composed of the base 100 formed of spun yarns becomes poor in air tightness.

Figure 3:
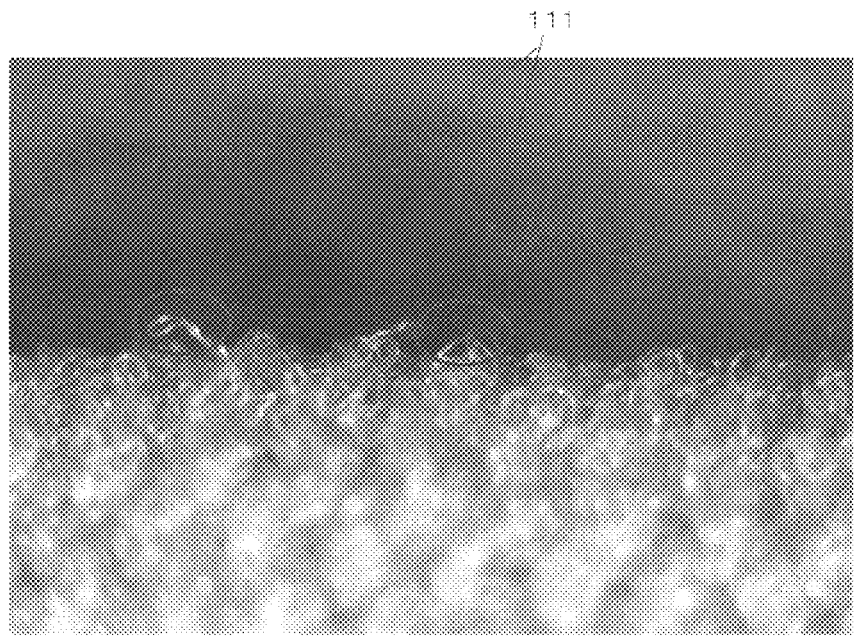
FIG. 3 is a photograph showing a base formed of filament yarns.

On the other hand, the case of filament yarn will be described. FIG. 3 is a photograph showing a base formed of filament yarns. A base 110 is formed of filament yarns such as chemical fibers. Like the case of the spun yarns, a base fiber is formed by twisting a plurality of filament yarns and the base 110 is formed by knitting the base fibers.

As apparent from FIG. 3, since the base 110 is configured such that end portions of filament yarns do not occur on a surface of the base 110, which is different from the base 100 formed of spun yarns, scuffing does not occur. However, since a basic fiber is obtained by twisting a plurality of filament yarns, portions of the twisted yarns may cause a loop-shaped projecting (hereinafter, called "projecting portion). FIG. 3 shows a state where the projecting portions 111 have occurred on a portion of a surface of the base 110. The present inventor has analyzed/elucidated such a fact that occurrence of the projecting portion 111 rather than the occurrence of the fussing is problematic regarding lowering of the air tightness in the base of the glove formed of filament yarns.

Since the projecting portion 111 is a portion of a twisted fiber, it project from the surface of the base 110 in a loop shape. The projecting portion 111 does not occur on the surface of the base 110 countlessly, which is different from the scuffing pieces 101. However, some projecting portions 111 occur on a portion of the surface of the base 110.

In the case of the scuffing prices 101, since they are present countlessly, and a significant number of scuffing pieces 101 after burning treatment remain, many holes or tears occur in the coating, of course. On the other hand, even in the base formed of filament yarns, a slight hole or tear can occur in the coating formed on the base 110 due to presence of such projecting portions 111. In the conventional art, a problem based upon fibers in such a base 110 formed of filament yarns was not analyzed and a cause of air tightness lowering after formation of the coating was not analyzed at all.

Figure 4:
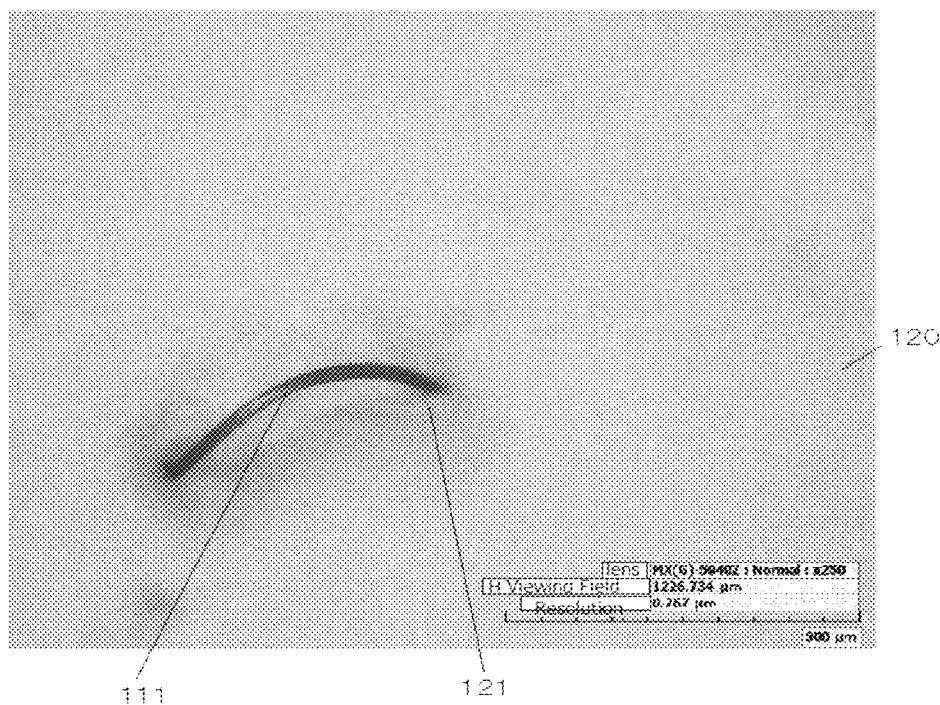
FIG. 4 is an enlarged photograph of a coating formed on the base composed of filament yarns.

The present inventor has keenly investigated an event occurring on a surface of a base, which is peculiar to filament yarns, resulting in that the event is caused by the projecting portions 111 like FIG. 3. The inventor has simultaneously analyzed the state of a surface of a glove where a coating has been applied to a base 110 having such remaining projecting portions 111. FIG. 4 is an enlarged photograph of a coating which has been applied to a base composed of filament yarns. As apparent from FIG. 4, even when a coating 120 is applied to the base, the projecting portion 111 projects above through the coating. A hole 121 occurs in the coating 120 due to projection of the projecting portion 111.

Figure 5:
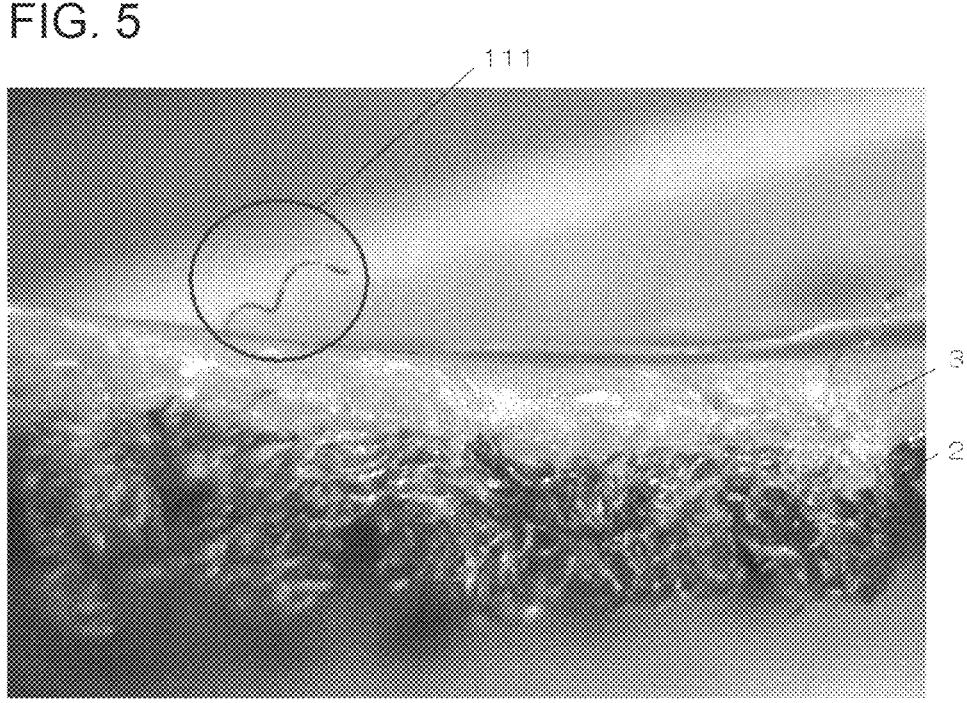
FIG. 5 is a partial sectional view of a cutting glove having a coating formed on a base composed of filament yarns.

Further, FIG. 5 is a sectional view of a portion of a glove obtained by applying a coating to a base composed of filament yarns like FIG. 4. Though a coating 120 has been applied on a portion of the base, it is understood that a portion of a loop-shaped projecting portion 111 breaks the coating 120 in a projecting fashion. This breaking in the projecting fashion lowers air tightness of the glove, of course.

That is, even if filament yarns which were thought to have satisfactory air tightness without being analyzed and being sufficiently considered in the conventional art are used, it has been elucidated by the present inventor that a hole 121 occurs in the coating 120 due to occurrence of the projecting portion 111. According to this elucidation, it has been analyzed that it is difficult to raise the air tightness sufficiently even in the base 110 composed of filament yarns. The loop-shaped projecting portion projects while having high hardness and strength, which is different from the scuffing, so that it is difficult to press down the projecting portion utilizing a coating. Due to this difficulty, the loop-shaped projecting portion penetrates a coating even if the coating is applied, so that a hole is generated in the coating, which results in lowering of air tightness. The present inventor has made such an analysis.

The present invention has clearly elucidated that it is difficult to improve the air tightness by the solution in the conventional art using spun yarns and that even the filament yarn has a factor of blocking the air tightness.

Overall Outline

First, an overall outline of a glove of an embodiment will be described.

Figure 6:
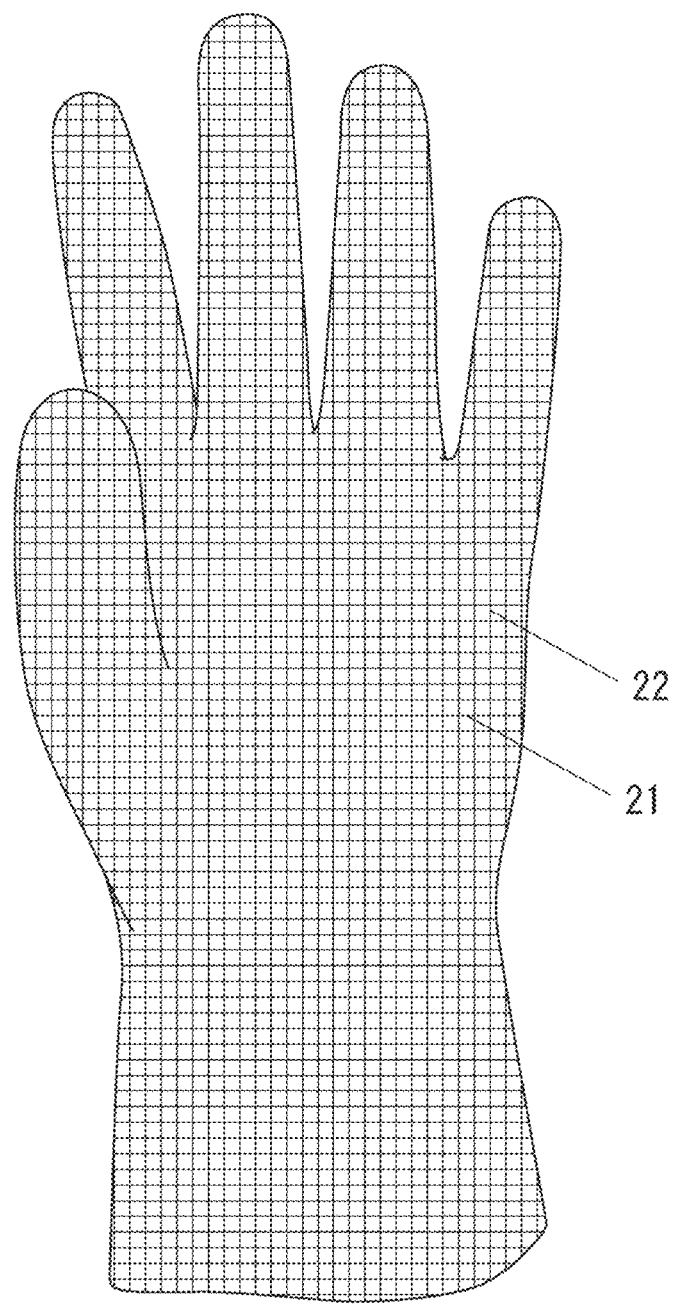
FIG. 6 is a front view of a glove in an embodiment of the present invention.

FIG. 6 is a front view of a base of a glove in an embodiment of the present invention. A base 2 is made of fibers to have a shape of a hand. The fiber-made base 2 is formed by knitting fibers 21. The base 2 is put in a state where it has meshes 22 by knitting the fibers 21.

Filament yarns are used in the base 2 obtained by knitting the fibers. As the filament yarn, a polyester yarn, a nylon yarn, a rayon yarn, a cuprayarn, an acetate yarn, a vinylideneyarn, a vinyloneyarn, a polypropylene yarn, a polyethylene yarn, or the like is used. Further, the yarn is preferably a yarn of the filament yarns fiber which is melted by heat without being carbonated, and it is preferably made of polyester, nylon, vinylon, vinylidene, polypropylene, polyethylene and the like. Further, in order to impart softness to the filament yarn, the filament yarn is further preferably subjected to wooly finish.

Figure 7:
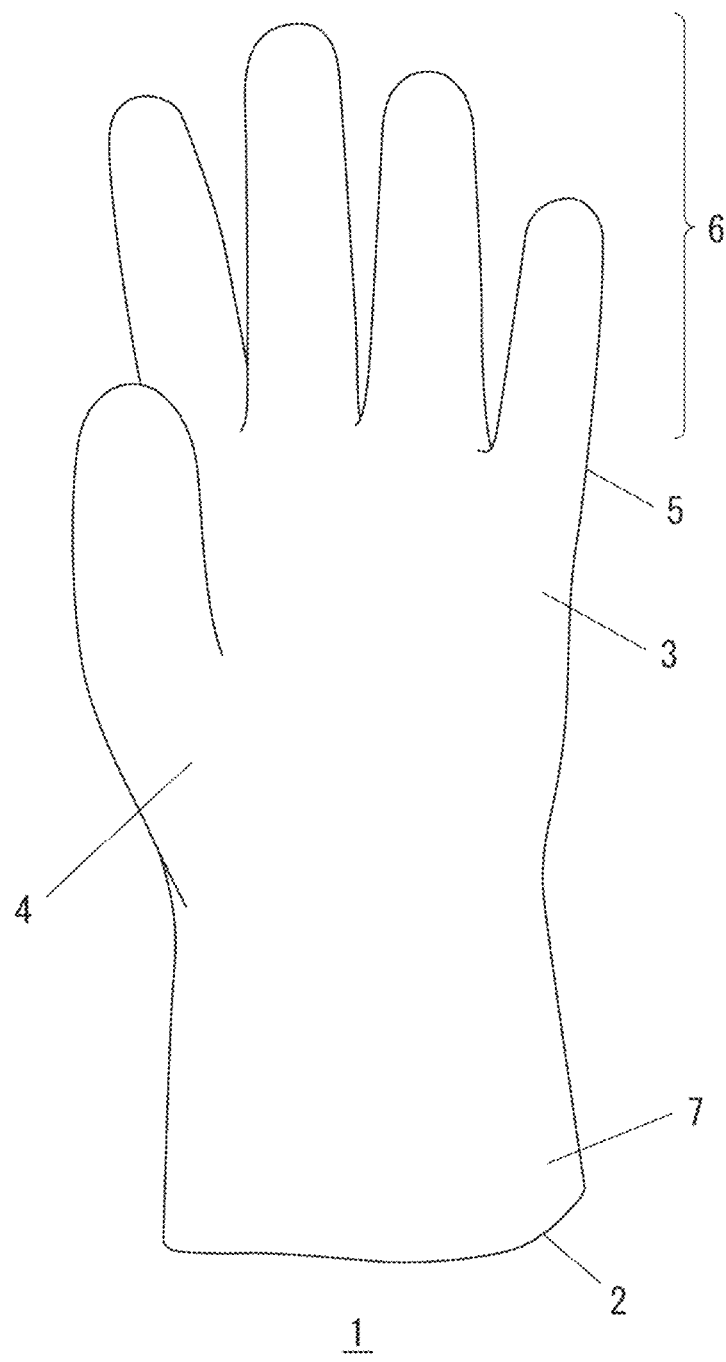
FIG. 7 is front view of a glove which has been applied with a coating in an embodiment of the present invention.

A coating is formed on at least a portion of a surface of the fiber-made base 2. FIG. 7 is a front view of a glove which has been applied to a coating in the embodiment of the present invention. A coating 3 is formed on the base 2 (the base 2 is coated with a coating 3). The meshes 22 present in the fiber-made base 2 are closed by formation of the coating 3, so that he surface of the glove 1 is sealed to be put in an air-tight state.

A glove 1 has a hand palm portion 4, a hand back portion 5, hand finger portions 6, and a wrist portion (which correspond to the palm of a hand of a human body, the back of a hand thereof, fingers thereof, a wrist thereof, respectively). The base 2 has a structure provided with the hand palm portion 4, the hand back portion 5, the hand finger portions 6, and the wrist portion 7. A coating 3 is formed on a surface of the base 2 having such a structure, so that the glove 1 provided with the coating 3 has a structure provided with the hand palm portion 4, the hand back portion 5, the hand finger portions 6, and the wrist portion 7 which are coincident with a shape of a hand of a person, as shown in FIG. 2.

Here, the base 2 formed of fibers 21 is immersed, in a coagulant, and it is next, immersed in a resin forming a coating. After the immersing step, a drying step is performed, so that liquefied resin is solidified and a coating 3 is formed on a surface of the base 2. When the coagulant is used, the base may swell, so that a problem of creases or swelling can be solved by the glove of the first embodiment.

Further, even the base formed of filament yarns has loop-shaped projecting portions 111 occurring when some of filament yarns have been twisted, as described using FIG. 3. If the projecting portions 111 remain as they are, such a problem as shown in FIG. 4 occurs, even if the coating 3 is formed.

Here, when the base 2 is coated with the coating 3, it is preferable that a specific treatment is applied to the base 2. It is preferable that a burning treatment is carried out as the specific treatment. In the burning treatment, a surface of the base 2 is burnt by a burner, a heater or the like to incinerate the projecting portions 111. Differences between projection amounts of the projecting portions 111 and projection amounts of portions of the base 2 other than the projecting portions 111 are reduced.

In other words, flattening is performed such that the height of the textured surface on a surface of the base 2 falls in a predetermined value range (the height falls into a predetermined value or less). As long as the surface of the base 2 are made of fibers, there are a textured surface over a range naturally occurring and an inconsistent projecting such as the projecting portion 111.

The projecting portion 111 which is the inconsistent (unforeseen) projecting is incinerated by the burning treatment, so that the textured surface of the surface of the base 2 fails into a range naturally occurring. That is, when the base is formed by knitting fibers, the textured surface of the base falls into a range of the textured surface occurring naturally.

The textured surface on the surface of the base 2 falls into a fiat state in a fixed range, so that even when the coating 3 is formed, occurrence of holes 121 or tears such as shown in FIG. 4 in the coating 3 can be remarkably reduced. As a result, the glove 1 can have high air tightness.

As one example of the air tightness, the glove 1 formed with the coating 3 can maintains the air tightness even if a pressure of 9 kPa or higher is applied to inside of the base 2 (inside the glove 1). Even when a pressure of 9 kPa or higher is applied to the inside of the base 2, the glove 1 prevents air from leaking and has high air tightness.

Next, details of respective elements and the like will be described.

Burning Treatment

The burning treatment burns the surface of the base 2, as described above. At this time, the burning treatment incinerates the projecting portions 111 occurring on the surface of the base 2 (in addition, it can also incinerate the scuffing if present).

For example, the surface of the base 2 is burnt by an instrument generating burning heat, such as a burner. Fire can be directly applied to the surface, or neat is imparted thereto without directly applying fire to the surface.

In fact, the base 2 is worn on a hand-shaped model having a hand of a person. The surface of the base 2 which has been worn on the model is roasted by flames of a burner or the like.

In the case of the base formed of spun filaments, a countless number of scuffing pieces 101 occur. It is difficult to incinerate all of such a countless number of scuffing pieces 101. On the contrary, in the case of the base 2 formed of filament yarns, the projecting portions 111 to some extent only occur. Therefore, it is possible to incinerate these projecting portions 111 by the burning treatment. A time and a heating amount required for the burning treatment are reduced as compared with those in the case of incinerating the countless number of scuffing pieces. Therefore, there is hardly such a concern that a burden or a drawback due to the burning treatment to the base 2 is present.

For example, in the case of the spun filaments, it is necessary to apply the burning treatment to the whole surface of the base 2 while taking a considerable time and having a considerable heating amount. As a result, there is such a problem that the countless number of scuffing pieces 101 are carbonated so that rough feel occurs.

On the other hand, in the glove 1 in the embodiment, the base 2 formed of filament yarns is used. Some projecting portions 111 are present in the base 2, and the burning treatment only incinerates these projecting portions 111. Therefore, the burning treatment can be performed with a reduced heating time and a reduced heating amount. As a result, the projecting portions 111 are not carbonated when they are incinerated, so that they are only melted simply. The projection amounts of the projecting portions 111 are reduced by the melting, so that the textured surface on the surface of the base 2 falls into a fixed range.

Specifically, loop-shaped projections of the projecting portions 111 having a loop shape are burnt out, so that the textured surface from the surface of the base 2 falls into a fixed range (a range of predetermined values). Here, the scuffing pieces 101 composed of spun yarns is carbonated by burning, but the projecting portions 111 composed of filament yarns are melted so that the loop shapes are burnt out. According to this mechanism, the filament yarns which are only melted such that the loop-shaped projecting portions 111 are burnt out, which is different from the spun yarns where the scuffing pieces 101 must incinerated completely, are subjected to the burning treatment, so that the projecting amount of the textured surface due to the projecting portions 111 can be suppressed securely.

Thus, the burning treatment to the glove according to the embodiment is not intended to burn out the scuffing pieces 101 and the projecting portions but is intended to suppress the textured surface from the surface of the base 2 due to the projecting portions 111 in a fixed range.

Figure 8:
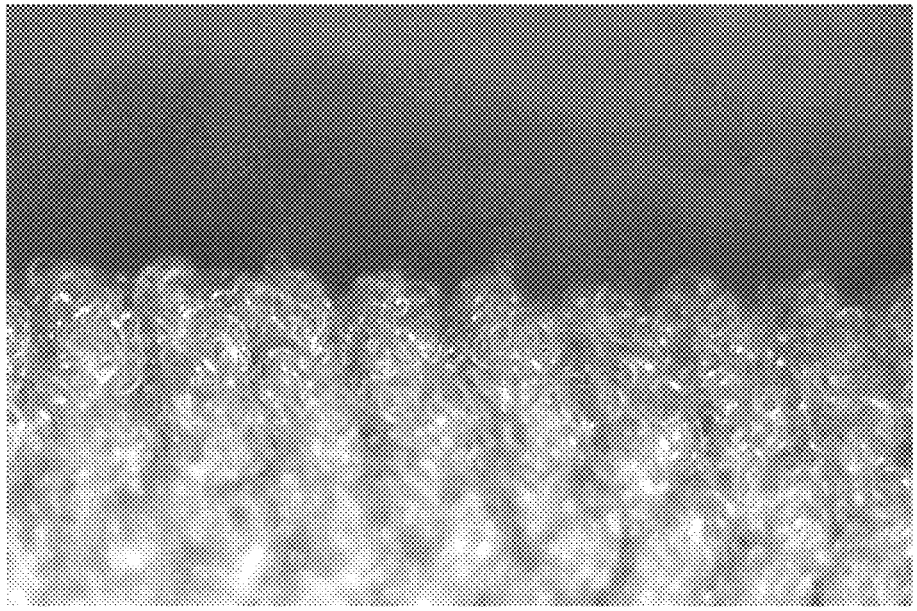
FIG. 8 is an enlarged photograph of a surface of a base which has been subjected to a burning treatment in an embodiment of the present invention.
Figure 9:
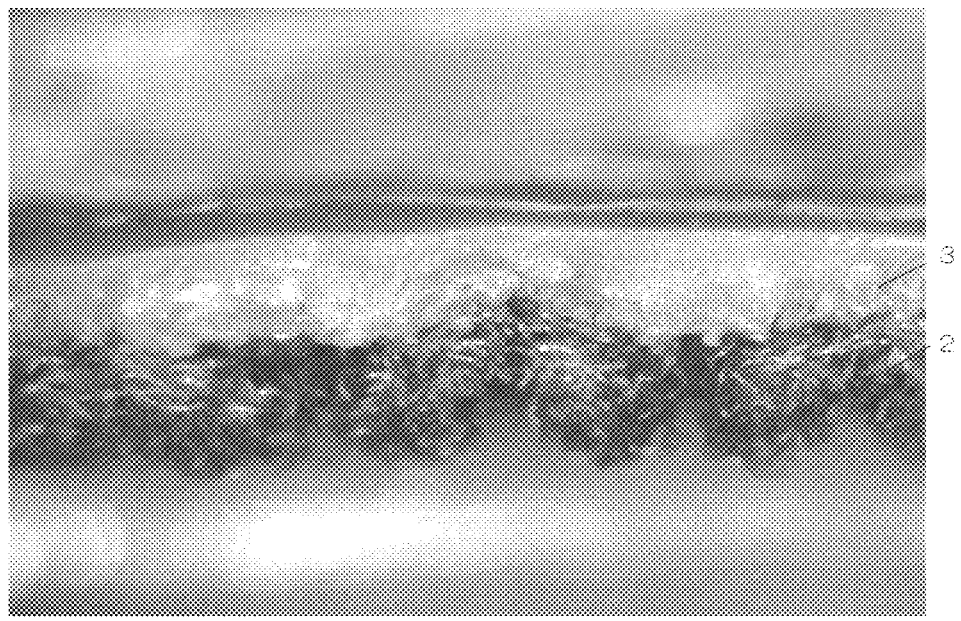
FIG. 9 is an enlarged photograph of a partial section of the glove in a state shown in FIG. 8.

By performing the burning treatment for suppressing the textured surface in the fixed range, the textured surface on the surface of the base 2 is flattened, so that holes or tears hardly occur even if the base 2 is coated with the coating 3. FIG. 8 is an enlarged photograph of a surface of the base 2 after the burning treatment in an embodiment of the present invention. FIG. 9 is an enlarged photograph of a section obtained by cutting a portion of the glove in a state shown in FIG. 8.

As apparent from FIG. 8 and FIG. 9 (particularly, as compared with FIG. 4 and FIG. 5), the textured surface due to the projecting portions 111 was suppressed in a fixed range by the burning treatment, so that holes or tears did not occur in the coating 3 (fibers did not penetrate the coating 3). The effect of the burning treatment was confirmed based upon an actual manufacturing example.

Figure 10:
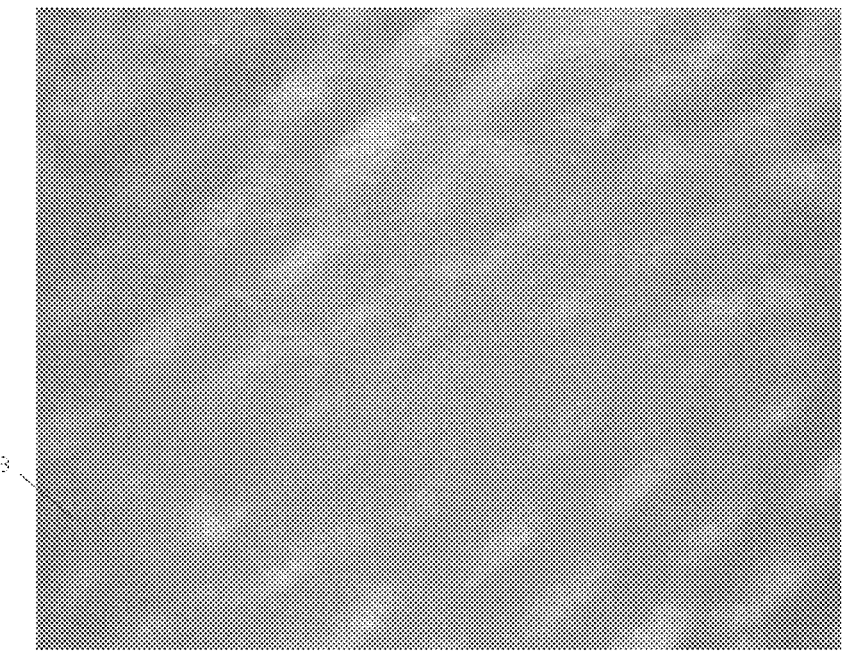
FIG. 10 is an enlarged photograph of a surface of a glove in an embodiment of the present invention.

Further, an enlarged photograph of a surface of the glove shown in FIG. 9 is shown in FIG. 10. FIG. 10 is an enlarged photograph of a surface of a glove in an embodiment of the present invention. As also apparent from FIG. 10, holes or tears cannot be conformed in the surface of the coating 3.

Cleaning Treatment

The specific treatment may include a cleaning treatment for cleaning the base 2. That is, the cleaning treatment may be further applied to the base 2 in addition to the burning treatment.

The cleaning treatment cleans a surface of the base 2 (and also a back surface by turning the base 2 over in some cases) using a cleaning agent. Oil component of the base 2 (knitting (machine) oil used when the base 2 is formed by knitting fibers) is removed. In addition, a shrinking treatment for the base 2 is realized. Further, the coagulant and the resin liquid are evenly caused to adhere to the base 2. Due to the even adhesion, a difference in thickness or thinness is reduced in respective portions of the coating 3 of the glove, and holes or tears are hard to occur naturally. As a result, the air tightness is also elevated by addition of the cleaning treatment.

Further, the base 2 is shrunk by the cleaning, so that the base is easily fitted on a hand-shaped model used when the coating is applied to the base, and the textured surface or the creases are hard to occur. At this point, also, such an effect that the textured surface of the base 2 is flattened occurs, so that air tightness after the coating 3 is formed is elevated.

In the cleaning treatment, various cleaning agents can be used. Further, the cleaning agent used here may be a general-purpose one. Further, the cleaning treatment may include a plurality of cleanings. When the plurality of cleanings are included in the cleaning treatment, different cleaning agents may be used in respective cleanings, and the same agent can be used in the cleanings. Furthermore, when the plurality of cleanings are included in the cleaning treatment, the cleanings may be performed at appropriate time intervals.

In the cleaning treatment, a general-purpose cleaning agent is poured into a cleaning machine to clean the base 2. The cleaned base 2 is dried in a drying machine or through natural drying, so that the base 2 is transferred to a coating step for forming the coating 3.

It should be noted that the burning treatment and the cleaning treatment are performed before the coating 3 is formed on the base 2.

Coated with Coating

Figure 11:
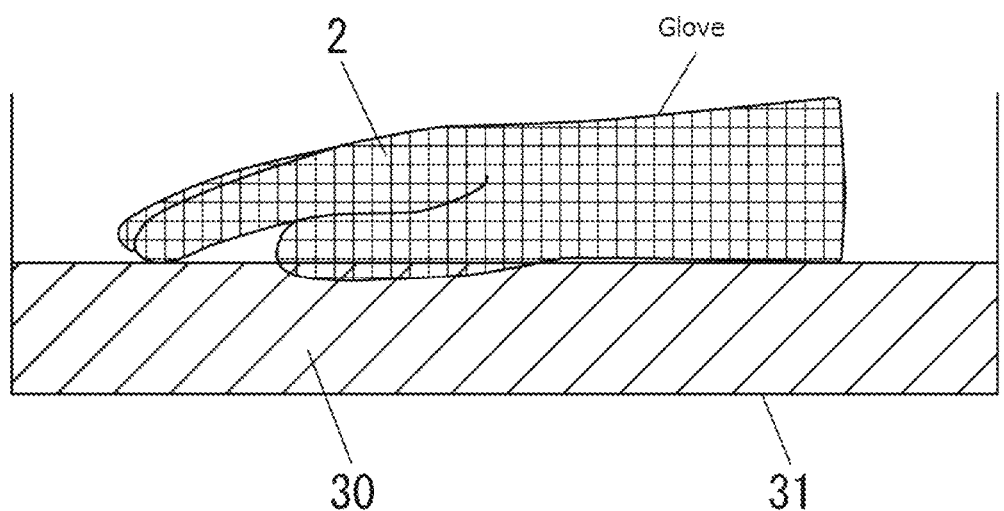
FIG. 11 is an explanatory view showing one of steps where a coating is formed on a base in an embodiment of the present invention.

After the specific treatment has been applied to the base 2, the base 2 is coated with a coating. FIG. 11 is an explanatory view showing one of steps where a base in an embodiment of the present invention is coated with a coating. FIG. 11 shows a state where the base 2 is immersed in a coating liquid 30 for coating (or a coagulant) in a vessel 31.

The hand palm portion 4 and the hand back portion 5 are alternately dipped in the coating liquid 30 (or the coagulant), so that the surface of the base 2 is immersed in the coating liquid 30. As described above, the base 2 has meshes 21 formed by the fibers. The surface (the hand palm portion 4, a hand back portion 5, and the finger portions 6, respectively) of the base 2 is covered with the coating liquid 30.

Before immersion in the coating liquid 30 forming the coating 3, the base 2 is immersed in the coagulant, so that after the base 2 is immersed in the coating liquid 30 for forming the coating 3, the coating liquid 30 can be solidified in a short time. If the solidification is achieved in a short time, such a merit that liquid sagging or unevenness of coating is hard to occur is obtained. The base 2 immersed in the coagulant is next immersed in the coating liquid 30.

Here, the viscosity of the coating liquid 30 is in a range from 300 mPa·s or higher to 1500 mPa·s or lower, and the viscosity is preferably in a range from 500 mPa·s or higher to 1000 mPa·s or lower. When the viscosity is too low, there is the problems that the coating liquid 30 easily permeates the fiber-made base 2, the coating 3 becomes excessively thin, a crack occurs, or texture is impaired. In order to reduce these problems, it is preferable that the viscosity in the above-described range is adopted.

Considering compatibility with the coagulant, or the air tightness and usability of the glove 1 after the coating 3 is formed while such a viscosity is being maintained, the coating liquid 30 is preferably made of either one of the following materials. That is, the coating liquid 30 is preferably at least one material of natural rubber, acrylonitrile butadiene rubber, chloroprene rubber, chloroprene rubber, polyvinyl chloride, acrylic resin, chlorosulfonated polyethylene, and polyurethane resin, or mixture thereof.

These materials have waterproof performance, air tightness, high grasping performance, and protection performance, respectively, and the coating 3 formed on the surface of the base 2 can provide various effects when a user uses the glove 1. In particular, when the coating 3 is formed, the base 2 hardly has the textured surface and the scuffing, so that holes or tears do not occur in the coating 3 and the air tightness as the material can be maintained.

Further, a stabilizing agent, a crosslinking dispersion, an antioxidant, a thickener, a plasticizer, an antiforming agent, or the like may be added in a liquefied material forming the coating 3, if necessary. The base 2 is immersed in the coating liquid in a state added with these materials, so that the coating 3 is formed on the surface of the base 2.

The crosslinking dispersion can be obtained by dispersing, in water, not only a crosslinking agent such as sulfur or peroxide but also a solid material such as an crosslinking accelerator such as BZ, TT, CZ, or PZ, a supplement crosslinking accelerator such as zinc oxide, or an antioxidant. The crosslinking dispersion is mainly used in the case that the coating liquid 30 is rubber latex. The crosslinking dispersion is added to the coating liquid 30 of rubber latex, so that rubber molecules are joined in a mesh shape and physical properties such as strength of the resin coating are improved.

Here, information of the coating 3, a single kind of coating liquid 30 may be used, or the coating 3 composed of a plurality of layers may be formed using a plurality of kinds of coating liquids 30. Of course, the coating 3 composed of a plurality of layers may be formed using the same kind of coating liquid 30. When the plurality of layers are formed, after the coating liquid 30 first applied is solidified, the next coating liquid 30 is applied.

When the coating 3 composed of a plurality of layers is formed, a grasping force, wearing feeling, impression from use, an appearance with designability, or the like can be realized in response to the specification required for the glove 1. In some cases, the coating 3 must have a plurality of layers in order to obtain such a merit.

In the conventional art, if holes or tears occur in the coating 3 due to the scuffing or the textured surface occurring in the base 2, it is difficult to form a plurality of layers in the coating 3. However, when the base 2 which has been subjected to the burning treatment or the like in this embodiment is adopted, holes or tears are hard to occur in the coating 3, so that it becomes easy to form a plurality of layers as the coating 3.

The base 2 may be immersed in the coating liquid 30 plural times in this manner. Here, such an explanation that the base 2 is immersed in the coating liquid 30 is a concept including that the surface of the coagulant is immersed in the coating liquid 30 and that the coating liquid 30 is infiltrated into the base 2 via the coagulant.

As described above, when the base 2 is immersed in the coating liquid 30 subsequently to the coagulant, the coating liquid 30 is solidified. The glove 1 is formed with the coating 3 by this solidification. Here, since the scuffing in the base 2 decreases/disappears, tears or holes are hard to occur in the coating 3. As a result, the glove 1 has high air tightness.

It should be noted that no occurrence of holes or tears means that a crevice or a crack penetrating in the thickness direction of the coating 3 does not occur.

Manufacturing Steps

Next, manufacturing steps will be described. As an outline of the manufacturing steps, a base 2 formed of stretchable fibers which are filament yarns is prepared. The base 2 is subjected to at least one specific treatment of the burning treatment and the cleaning treatment at a step performed before it is coated with a coating. After the specific treatment, the base 2 is immersed in the coagulant. After the base 2 is immersed in the coagulant, the base 2 is immersed in the coating liquid 30 so that the surface of the base 2 is coated with the coating 3. Thereafter, the base 2 is dried and vulcanized at a temperature of 60° C. for one hour and at a temperature of 120° C. for one hour, so that the glove 1 according to the embodiment is manufactured.

Details of the Manufacturing Steps will be Described.

(Step 1) As explained in the embodiment, a base is formed of filament yarns.

(Step 2) The base 2 is cleaned at a cleaning machine using a general-purpose cleaning agent or the like. A specific cleaning agent other than the general-purpose cleaning agent may be used.

(Step 3) The cleaned base 2 is dried in a dryer. It should be noted that the Step 2 or the Step 3 may be introduced according to necessity.

(Step 4) The base is put and worn on a hand-shaped model. A burning treatment for roasting a surface of the worn base by fire of a heating apparatus such as a gas burner is performed. Projecting portions are incinerated by the roasting.

(Step 5) The hand-shaped model is preheated to about 60° C. by a heater (for example, an oven or the like).

(Step 6) The base is immersed in calcium nitrate/methanol coagulant with a concentration of 5%.

(Step 7) The base is immersed in a coating liquid serving as a liquid constituting a coating.

(Step 8) The base which has been immersed in the coating liquid is dried at a temperature of about 60° C. for about one hour.

(Step 9) vulcanization is performed at a temperature of about 120° C. for about one hour.

The glove 1 according to the embodiment is manufactured according to these steps.

The glove 1 manufactured according to the steps has high air tightness, as described above.

Air Tightness Experiment Result

Figure 12:
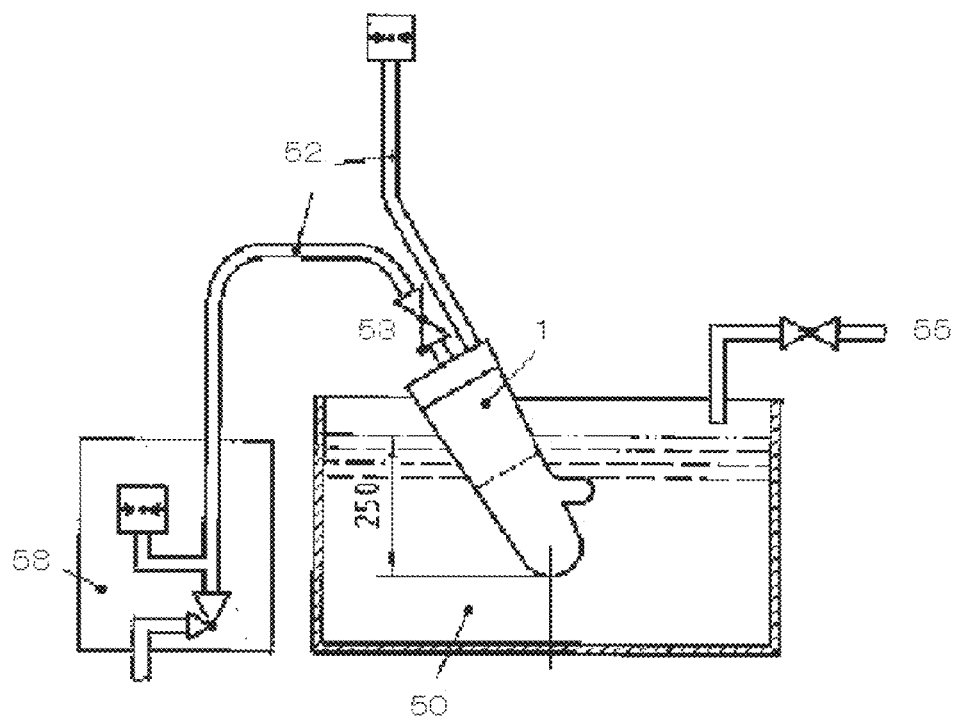
FIG. 12 is a schematic view of a measuring instrument used in an air tightness test in an embodiment of the present invention.

Next, an experiment result about the air tightness will be described. A method of an air tightness experiment will be described with reference to FIG. 12. FIG. 12 is a schematic view of a measuring instrument used in the air tightness experiment in an embodiment of the present invention.

In this experiment, adaptation to European Standards (EN374) was confirmed. The experiment was implemented in an aspect shown in FIG. 12. A glove 1 is dipped in a water tank 50. Water is charged in the water tank 50, and the glove 1 is disposed in the water. Air is fed to inside of the glove 1 via an air pipeline 52. An air pressure is imparted to the inside of the glove 1 according to the feeding of air. Whether or not air bubbles are generated inside of the water tank 50 while the air pressure is imparted to the inside is confirmed. At this time, as shown in Table 1, an air pressure imparted is defined to be different according to differences in the thickness of the glove.

TABLE 1

| Thickness of Glove | Air pressure |
| --- | --- |
| 0-0.3 mm | 0.5 kPa |
| 0.3-0.5 mm | 2.0 kPa |
| 0.5-1.0 mm | 5.0 kPa |
| More than 1.0 mm | 6.0 kPa |

Further, in addition to Table 1, an air pressure of 1 kPa is added for each increase of 100 mm. of the depth of water regarding sinking of the glove. Presence/absence of air bubbles is confirmed according to these air pressures. Pressurization is performed up to an arbitrary air pressure (Table 2 and air pressure to be added) for 30 seconds, and after the air pressure is then maintained for 2 minutes, presence/absence of air bubbles is confirmed. If air bubbles are absent, pass is determined regarding the air tightness. It should be noted that if air bubbles are not found in this experiment under the condition where the thickness of the glove is 1.0 mm or thicker, the depth of water is 200 mm, and the pressure is a pressure of (6.0+2.0)=8.0 kPa, the glove is determined to reach the required grade regarding the air tightness.

In this experiment aspect, experiments of Example 1 to Comparative Example 4 shown in FIG. 2 were performed. The examination result is shown in Table 2.

TABLE 2

| | | Air Pressure Resistance |
| --- | --- | --- |
| Example 1 | After a glove base which was made of polyester and was subjected to a burning treatment was immersed in calcium nitrate/methanol coagulant with a concentration of 5%. Thereafter, the glove base was dried in an oven at a temperature of 60° C. for one hour and vulcanization was performed in an oven at a temperature of 120° C. for one hour, so that a glove was manufactured. | 9.3 kPa |
| Example 2 | A polyester glove base which was subjected to a cleaning treatment using neutral cleaning agent was further subjected to a burning treatment, and after it was immersed in calcium nitrate/methanol coagulant with a concentration of 5%, it was immersed in compound solution of acrylonitrile butadiene rubber. Thereafter, the glove base was dried in an oven at a temperature of 60° C. for one hour and vulcanization was performed in an oven at a temperature of 120° C. for one hour, so that a glove was manufactured. | 11.0 kPa |
| Comparative Example 1 | A glove was manufactured in a similar manner to Example 1 except that a glove base which was made of polyester and was not subjected to a burning treatment was used. | 4.1 kPa |
| Comparative Example 2 | A glove was manufactured in a similar manner to Example 2 except that a glove base which was made of polyester and was not subjected to a burning treatment was used. | 3.3 kPa |
| Comparative Example 3 | A glove was manufactured in a similar manner to Example 1 except that a glove base was made of spun yarns of cotton. | 2.2 kPa |
| Comparative Example 4 | A glove was manufactured in a similar manner to Example 2 except that a glove base was made of span yarns of cotton. | 2.2 kPa |

As apparent from Table 2, Example 1 based upon the base which was subjected to the burning treatment has an air pressure resistance of 9.3 kPa and Example 2 which was subjected to both the cleaning treatment and the burning treatment has an air pressure resistance of 11.0 kPa. In both the Examples, the air pressure resistances thereof exceed 9 kPa which is one of European Standards (EN), so that it has also been confirmed in the experiment result that the glove 1 according to the embodiment has high air tightness.

On the other hand, the comparative example 1 and the comparative example 2 which were not subjected to the burning treatment, and the comparative example 3 and the comparative example 4 which are the bases composed of spun yarns have only low air tightness, as shown in Table 2.

As described above, it has also been confirmed from the experiments that the air tightness of the glove 1 according to the embodiment is high.

It should be noted that the glove explained in the embodiment is only one example, and the present invention also includes other embodiments modified without departing from the gist of the present invention.

The present application is a continuation of International Application No. PCT/JP2014/069769 filed Jul. 28, 2014, which designated the United States, and claims the benefit under 35 USC §119(a)-(d) of Japanese Application No. 2013-271333 filed Dec. 27, 2013, the entireties of which are incorporated herein by reference.

REFERENCE NUMERALS 1 glove
2 base
3 coating
4 palm of a hand
5 back of a hand
6 finger portion
21 fiber
22 mesh
30 coating liquid
31 vessel

The invention claimed is:
1. A method of manufacturing a glove comprising:
a forming step of forming a base, only of filament yarn, having a shape of a hand of a person and having an inner portion for receiving the hand of the person;
providing a coating liquid having a viscosity in a range of 300 mPa·s or more to 1500 mPa·s or less;

a coating forming step of forming a coating on at least an outer surface of the base;

a burning treatment step of performing a burning treatment at least to an outer surface of the base, before the outer surface of the base is coated with the coating, wherein the burning treatment burns off loop-shaped projecting portions of the filament yarn to flatten a texture of the outer surface of the base; and a cleaning treatment step of cleaning and drying the base, to clean and shrink the base, before the burning treatment step;

whereby even when a pressure of 9 kPa or higher is applied to the inner portion of the base of the glove, air tightness is maintained where the coating has been applied to the base of the glove.

2. The method according to claim 1, wherein the cleaning treatment removes an oil component from the base.

3. The method according to claim 1, wherein the coating is obtained by immersing at least the outer surface of the base in a coagulant and then immersing at least the outer surface of the base in the coating liquid.

4. The method according to claim 3, wherein the coating liquid includes at least one material selected from the group consisting of a natural rubber, an acrylonitrile butadiene rubber, a chloroprene rubber, a polyvinyl chloride, an acrylic resin, a chlorosulfonated polyethylene, and a polyurethane resin.

5. The method according to claim 4, wherein the base is immersed in the coating liquid a plurality of times.

6. The method according to claim 1, wherein the filament yarn is at least one of a polyester yarn, a nylon yarn, a vinylon yarn, a vinylideneyarn, a polypropylene yarn, and a polyethylene yarn.

* * * * *